United States Patent
Kanthak et al.

(10) Patent No.: US 10,108,632 B2
(45) Date of Patent: Oct. 23, 2018

(54) SPLITTING AND MOVING RANGES IN A DISTRIBUTED SYSTEM

(71) Applicant: Google LLC, Mountain View, CA (US)

(72) Inventors: Sebastian Kanthak, San Jose, CA (US); Clifford Arthur Frey, San Francisco, CA (US)

(73) Assignee: Google LLC, Mountain View, CA (US)

( * ) Notice: Subject to any disclaimer, the term of this patent is extended or adjusted under 35 U.S.C. 154(b) by 194 days.

(21) Appl. No.: 15/144,353

(22) Filed: May 2, 2016

(65) Prior Publication Data

US 2017/0316026 A1    Nov. 2, 2017

(51) Int. Cl.
G06F 17/30 (2006.01)

(52) U.S. Cl.
CPC .. *G06F 17/30138* (2013.01); *G06F 17/30194* (2013.01); *G06F 17/30575* (2013.01); *G06F 17/30584* (2013.01)

(58) Field of Classification Search
CPC ........ G06F 17/30008; G06F 17/30138; G06F 17/30194; G06F 17/30575; G06F 17/30584
USPC ......................................................... 707/615
See application file for complete search history.

(56) References Cited

U.S. PATENT DOCUMENTS

| | | | |
|---|---|---|---|
| 6,343,294 B1 * | 1/2002 | Hawley | G06F 17/30067 707/803 |
| 6,453,325 B1 * | 9/2002 | Cabrera | G06F 11/1461 707/640 |
| 7,801,848 B2 | 9/2010 | Hazlewood et al. | |
| 8,346,722 B2 | 1/2013 | Mordvinova et al. | |
| 8,965,921 B2 | 2/2015 | Gajic | |
| 2010/0106934 A1 | 4/2010 | Calder | |
| 2012/0109888 A1 | 5/2012 | Zhang et al. | |
| 2013/0290249 A1 | 10/2013 | Merriman et al. | |
| 2013/0311426 A1 | 11/2013 | Erdogan et al. | |
| 2014/0172794 A1 | 6/2014 | Bartholoma et al. | |

(Continued)

FOREIGN PATENT DOCUMENTS

WO    2013/177193    11/2013

OTHER PUBLICATIONS

Chang et al., "Bigtable: A Distributed Storage System for Structured Data," ACM Transactions on Computer Systems (TOCS), 26(2):1-14, Jun. 2008.

(Continued)

*Primary Examiner* — Shahid Alam
(74) *Attorney, Agent, or Firm* — Fish & Richardson P.C.

(57) ABSTRACT

Methods and systems for a distributed transaction in a distributed database system are described. One example includes identifying a request to insert a split point in a source group comprising one or more tablet replicas, each tablet including at least a portion of data from a table in the distributed database system, and the split point splitting data in the source group into a first range and a second range different than the first range; in response to the request: sending a list of filenames in the first range of the source group to a first target group comprising one or more tablet replicas; and creating, at the first target group, a virtual copy of files represented by the list of filenames in the first range, the virtual copy making data of the files available, each using a new name, without duplicating the data of the files.

20 Claims, 5 Drawing Sheets

(56) References Cited

U.S. PATENT DOCUMENTS

2015/0186490 A1    7/2015  Denuit et al.

OTHER PUBLICATIONS

International Search Report and Written Opinion in International Application No. PCT/US2016/066506, dated Mar. 13, 2017, 16 pages.
Written Opinion issued in International Application No. PCT/US2016/066506, dated Apr. 11, 2018, 8 pages.
International Preliminary Report on Patentability issued in International Application No. PCT/US2016/066506, dated Jul. 19, 2018, 36 pages.

* cited by examiner

… (1)

SPLITTING AND MOVING RANGES IN A DISTRIBUTED SYSTEM

BACKGROUND

This specification generally relates to splitting large groups in a distributed database system.

When repartitioning data in a distributed database, large chunks of data are often copied to be moved. The time and resources required by current repartitioning implementations often cause problems, in particular when trying to split large groups with heavy write loads and as a result, splits that grow many times larger than a size threshold are not uncommon. Therefore, a need has arisen for a mechanism to quickly and efficiently split large groups in a distributed database.

SUMMARY

In general, one aspect of the subject matter described in this specification may be embodied in systems, and methods performed by data processing apparatuses that include actions for a distributed transaction in a distributed database system, including identifying a request to insert a split point in a source group, the source group comprising one or more tablet replicas, each tablet including at least a portion of data from a table in the distributed database system, and the split point splitting the data in the source group into a first range and a second range different than the first range; and, in response to the request to insert the split point in the source group, sending a list of filenames in the first range of the source group to a first target group, the first target group comprising one or more tablet replicas, and creating, at the first target group, a virtual copy of files represented by the list of filenames in the first range, the virtual copy making the contents of the files available each under a new name without duplicating data of the files.

The systems and methods may further include adding the files in the first range to the first target group, instructing the source group that the first target group no longer depends on the files in the first range at the source group, and deleting the files in the first range from the source group. Further, in response to the request to insert the split point in the source group, a list of filenames in the second range of the source group may be sent to a second target group, the second target group including one or more tablet replicas, and a virtual copy of files represented by the list of filenames in the second range may be created at the second target group, the virtual copy making the contents of the files available each under a new name without duplicating data of the files.

In addition, the systems and methods may include sending, from the source group, contents of in-memory buffered updates in the first range, and adding, at the first target group, the contents of in-memory buffered updates in the first range from the source group to the in-memory buffered updates of the target group.

According to certain embodiments, the distributed transaction is executed according to a two-phase commit protocol comprising a voting phase and a commit phase. A majority of tablets in each group must commit in the voting phase for the distributed transaction to complete. In response to a vote to abort in the voting phase, each group undoes the transaction.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
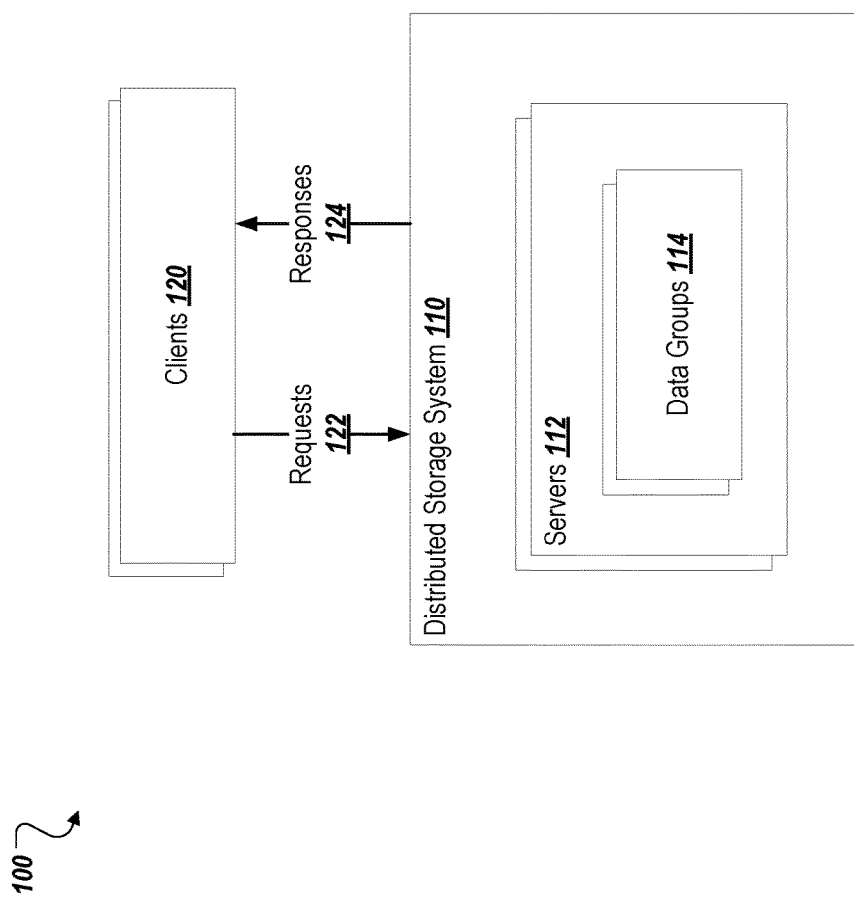
FIG. 1 is a diagram of an example environment for splitting large groups in a distributed storage system.

When repartitioning data in a distributed database, standard implementations copy the entirety of data to be moved. For example, splitting data or changing a replication level requires making a whole new copy of the data in the new configuration. Embodiments described herein provide a mechanism to avoid this extra copy by sharing on-disk copies of the data whenever possible. For example, when splitting data, rather than making a new copy of the two partitions, a virtual view of the existing partition may be provided that makes the existing partition usable as two separate portions. Only when a new copy of the data would otherwise be made, for example when rewriting data into a more compact form (i.e., a "compaction"), does the virtual copy need to be resolved into a real copy of the data. According to certain embodiments, a database is partitioned into groups, where each group is a replicated set of tablets. A tablet includes a list of immutable files, also called layers, and an in-memory representation of buffered updates. A group may be split into two or more groups, two or more groups may be merged, or data may be moved from one group to another group with a different replication configuration (e.g., from a group with tablets only in the United States to a group with tablets only in Europe).

Embodiments described herein allow moving data between replicated partitions more efficiently. The replicated partitions are groups, each consisting of one or more tablets that each hold a copy of the data. Each tablet may be served by exactly one server. A tablet is a data structure that may be a container which may encapsulate multiple partitions of the row space or sequence of rows. Data can be split at some split point, for example, by moving from one group into two new groups. The first group may receive the lower part of the range (i.e., up to the split point) of data, the second group may receive the latter part of the range of data, and the range may be removed from the source group. Similarly, data can be merged by moving from two source groups into one target group. The move of data must occur at substantially the same time in all tablets. To do so, for example, the system commits a distributed transaction that includes the source group(s), the target group(s), and a system table that contains metadata mapping ranges to groups. This distributed transaction describes the move and contains the split point as well as which range goes to which target. Each group replicates the transaction, which assures that each tablet will apply the transaction. When source tablets apply the transaction, the source tablets take a snapshot of current contents and preserve it. When target tablets apply the transaction, they contact the source tablet to transfer the ranges to be moved. The state of a tablet is split into immutable files stored in a cluster filesystem and in-memory state for buffered updates. Source tablets transfer ranges to the target tablet by sending a list of all the filenames in the snapshot and the contents of all the in-memory updates that fall into the range to be transferred. The target tablet adds the contents to its in-memory buffered updates, creates a snapshot of all the files, and adds the snapshotted files to its contents, wrapped in a filter that restricts the file contents to the ranges requested. These snapshots are similar to a symbolic link by making the contents of the file available under a new name, without having to duplicate the underlying data. The data from in-memory buffered updates may be streamed between groups via, for example, a transmission control protocol (TCP) connection. The target group then informs the source group that the target group no longer requires the source files and that the source group may delete those files. Typically, the source group deletes the files when the source group rewrites the files at its next periodic compaction.

The techniques described herein may provide the following advantages. For example, this approach allows splitting to be made more efficient, both in time and space, making it possible to repartition the data more often and as a result of a wider variety of criteria. For example, an overloaded partition may be more quickly and efficiently split.

Accordingly, the present disclosure describes techniques for splitting large groups in a distributed storage system. One example method for a distributed transaction in a distributed database system includes identifying a request to insert a split point in a source group, the source group including one or more tablet replicas, each tablet including at least a portion of data from a table in the distributed database system, and the split point splitting the data in the source group into a first range and a second range different than the first range. In response to the request to insert the split point in the source group, a list of filenames in the first range of the source group is sent to a first target group, the first target group including one or more tablet replicas. A virtual copy of files represented by the list of filenames in the first range is created at the first target group, the virtual copy making the contents of the files available each under a new name without duplicating data of the files.

The files in the first range may be added to the first target group, and the source group may be instructed that the first target group no longer depends on the files in the first range at the source group. In response, the files in the first range may be deleted from the source group. Further, in response to the request to insert the split point in the source group, a list of filenames in the second range of the source group may be sent to a second target group, the second target group including one or more tablet replicas. In addition, a virtual copy of files represented by the list of filenames in the second range may be created at the second target group, the virtual copy making the contents of the files available each under a new name without duplicating data of the files. Moreover, contents of in-memory buffered updates in the first range may be sent from the source group and added, at the first target group, to the in-memory buffered updates of the target group.

According to certain embodiments, the distributed transaction is executed according to a two-phase commit protocol comprising a voting phase and a commit phase. A majority of tablets in each group must commit in the voting phase for the distributed transaction to complete. On the other hand, in response to a vote to abort in the voting phase, each group undoes the transaction.

In general, according to embodiments of the invention, a move of data associated with inserting or removing a split point is executed by a transaction that includes the source group and the target group as participants. The transaction may update the appropriate metadata tables to reflect the new data locations and may update the split points, as well as updating the metadata table of split points in the source and destination groups to reflect the move. The transaction may also include range data for the source and target groups that specify the ranges of user data to be moved and any split offset to apply. When the source tablets of the source group apply the range data, they may preserve the current layer stack and prepare to serve it to the target tablets of the target group. Target tablets may retrieve these layers from the source tablets in the same zone, where zones are the unit of administrative deployment. The set of zones may also be the set of locations across which data can be replicated. Zones may be added to or removed from a running system as new datacenters are brought into service and old ones are turned off, respectively. There may be one or more zones in a datacenter, for example, if different applications' data must be partitioned across different sets of servers in the same datacenter. After the target tablets retrieve the current layer stack of the source tablets, layers of a table that is a persistent, ordered, immutable map from keys to values may be snapshotted by the target tablet. Rather than synchronously resolving those moved layers, target tablets may insert one or more proxy layers in the apply loop that specify the ranges to be moved. These proxy layers may cause reads of the moved, but not yet resolved, ranges to fail with a retryable error returned. The target tablet thus may continue its apply loop while resolving the moved ranges in the background. Source group deletion may be achieved by writing the contents of all ranges that have been moved out, but have not yet been released by the target group, into a replicated table in the target group before deleting the source group, which may allow the source group to delete itself even if some tablets of the target group are unavailable. Although this example is described with reference to inserting or removing a split point, the same systems and methods apply to inserting or removing many split points.

FIG. 1 is a diagram of an example environment 100 for splitting large groups in a distributed storage system. As shown, the environment 100 includes a distributed storage system 110 including a plurality of servers 112 each managing a plurality of data groups 114. In operation, clients 120 may send requests 122 to the distributed storage system 110. The distributed storage system 110 may process the requests 122 and may send responses 124 to the clients 120.

The distributed storage system 110 may be a distributed system including a plurality of servers 112 connected by a local or private network (not shown). In some cases, the local or private network may be located entirely within a single facility, while in other cases the local or private network may cover a large area and interconnect multiple facilities. The servers 112 may communicate with one another in order to service the client request 122 by storing, retrieving, and updating data as requested by the clients 120. In some cases, the distributed storage system 110 may be a distributed database, a distributed file system, or other type of distributed storage. The distributed storage system 110 may also include components to manage and organize the operations of the servers 112 within the system.

Within the distributed storage system 110, each server 112 may be a computing device including a processor and a storage device, such as a hard drive, for storing data managed by the distributed storage system 110. In some cases, data may be distributed to the different servers 112 according to a distribution policy. For example, a distribution policy may specify that a particular table or file within the distributed storage system 110 must be stored on a particular number of the servers 112 to maintain redundancy. The distribution policy may also specify, for example, that the data must be stored in multiple different locations in order to maintain geographic redundancy. In some cases, the server 112 may utilize an external storage device or system, such as a distributed file system, instead of a directly connected persistent storage.

Each of the servers 112 may manage one or more data groups 114. The data groups 114 may include portions of the total data set managed by the distributed storage system 110. Each data group 114 may include data from a portion of a table in a distributed database, one or more files from a distributed file system, or other partitions of data within the distributed storage system 110. In operation, each request 122 may be analyzed by distributed storage system 110 to determine, based on the request target, the particular data group 114 to which the request pertains. The distributed storage system may then route the request to a particular server 112 managing the particular data group 114.

In some cases, the clients 120 may be users of the distributed storage system 110. The clients 120 may also be entities (e.g., websites or applications) using the distributed storage system 110 to store and retrieve data. Each of the clients 120 may record information about each request 122 it sends to the distributed storage system 110. In some cases, each client 120 may store a record of the entire request as sent to the distributed storage system 110. Each client may also store a summary of the request 122 sent to the distribute storage system, such as, for example, storing a count of requests sent with the same set of request parameters.

Figure 2:
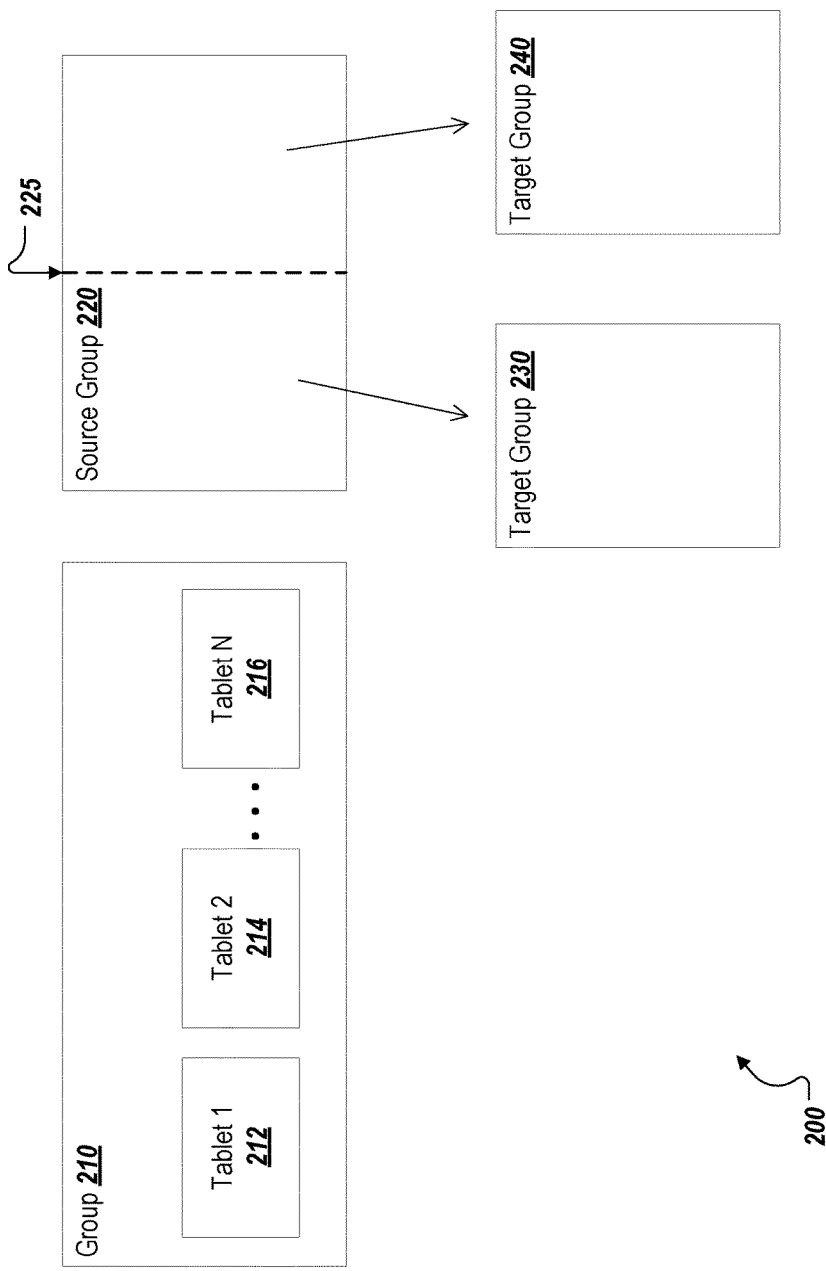
FIG. 2 is a diagram of an example distributed database group in a process for splitting large groups in a distributed storage system.

FIG. 2 is a diagram of an example distributed database 200 group in a process for splitting large groups in a distributed storage system. If, for example, the data stored at a particular group gets too large, a new split point may be added in the group to split the data into two or more ranges. A group 210 may include one or more tablets 212-216, and the tablets 212-216 in the group 210 may be replicas of each other, i.e., tablet replicas. When a group 210 is without error, all tablets 212-216 in the group 210 are identical. Each group 210 may include a leader tablet that is currently selected as the leader for that group. The leader tablet serves as the authority for data in that group, similar to a master copy, and if that leader stops responding, another tablet is selected as the leader tablet.

Split points in the key space determine boundaries between groups, which, in turn, determines the distribution of the load or bytes of data. For operating efficiency, it is undesirable to have one shard performing too many reads or writes. Thus, a distribution policy may include threshold limits for a number of records in each group or a size of data or CPU load usage for each group. To handle rebalancing of data, split points may be periodically added or removed, as required.

For example, as depicted in FIG. 2, when a split point 225 is added to a source group 220, a target group 230 may be assigned a first range including data up to the split point 225 from the source group 220. In some embodiments, a second range including the latter portion of data after the split point 225 may remain assigned to the source group 220 or may be assigned to a different target group 240.

Figure 3:
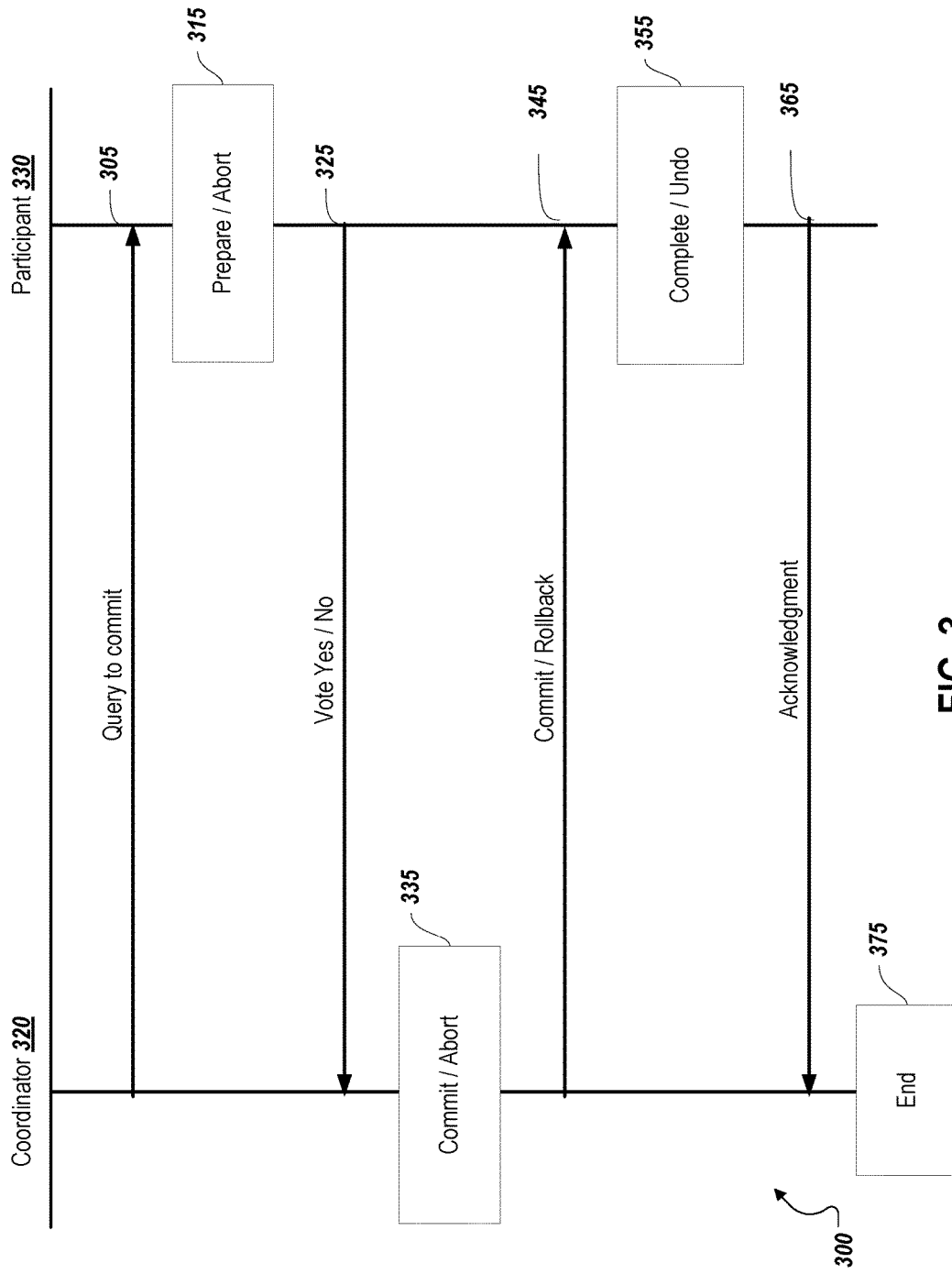
FIG. 3 is a swim lane diagram of an example process for coordinating a distributed transaction in a distributed storage system.

FIG. 3 is a swim lane diagram of an example process 300 for coordinating a distributed transaction in a distributed storage system. As shown in FIG. 3, the coordination is achieved by a two-phase commit protocol, including a voting phase and a commit phase. A two-phase commit protocol is a type of atomic commitment protocol that coordinates all processes that participate in the distributed transaction on whether to commit or abort the transaction by consensus. When no failure occurs, the two phases of the protocol proceed according to the following description.

First, the voting phase is a phase in which a coordinator process attempts to prepare all the participating processes of the transaction (i.e., the participants) to take the necessary steps for either committing or aborting the transaction, and to vote to either commit if, for example, the participant's local portion execution has ended properly, or to abort if, for example, a problem has been detected with the local portion. For example, one group in the transaction may be selected as the coordinator 320, and the remaining group(s) in the transaction may be the participants 330. In a transaction between two different groups, the majority of tablets in each group must agree to commit, such that both groups vote to commit.

Next, the commit phase is a phase in which, based on the voting of the participants 330, the coordinator 320 decides whether to commit if all participants 330 have voted to commit or to abort the transaction otherwise. The coordinator 320 notifies the result to all the participants 330 and the participants 330 then proceed with the required actions to commit or to abort with their local transactional resources (e.g., database data).

In the voting phase, the coordinator 320 sends a query-to-commit message 305 to all participants 330 and the coordinator 320 waits until it has received a reply from all participants 330. The participants 330 execute the transaction up to the point where they will be asked to commit, either preparing to commit or aborting if a failure occurs 315. Each participant replies with an agreement message 325, i.e., a vote to commit, if the participant's actions succeeded, or an abort message, i.e., a vote to abort, if the participant experiences a failure that will make it impossible to commit.

In the commit phase, the coordinator 320 determines whether to commit or abort 335 in response to the votes from each of the participants 330. If the coordinator 320 received an agreement message from all participants 330 during the voting phase, the coordinator 320 sends a commit message 345 to all the participants 330. Each participant 330 completes the operation 355, releases all the locks and resources held during the transaction, and sends an acknowledgment 365 to the coordinator 320. The coordinator 320 completes the transaction when all acknowledgments have been received and the process ends 375. If any participant 330 votes to abort 325 during the voting phase, or if the coordinator's 320 timeout expires, the coordinator 320 sends a rollback message 345 to all the participants 330. Each participant 330 undoes the transaction 355, releases the resources and locks held during the transaction, and sends an acknowledgement 365 to the coordinator 320. The coordinator 320 undoes the transaction when all acknowledgements have been received and the process ends 375.

Figure 4:
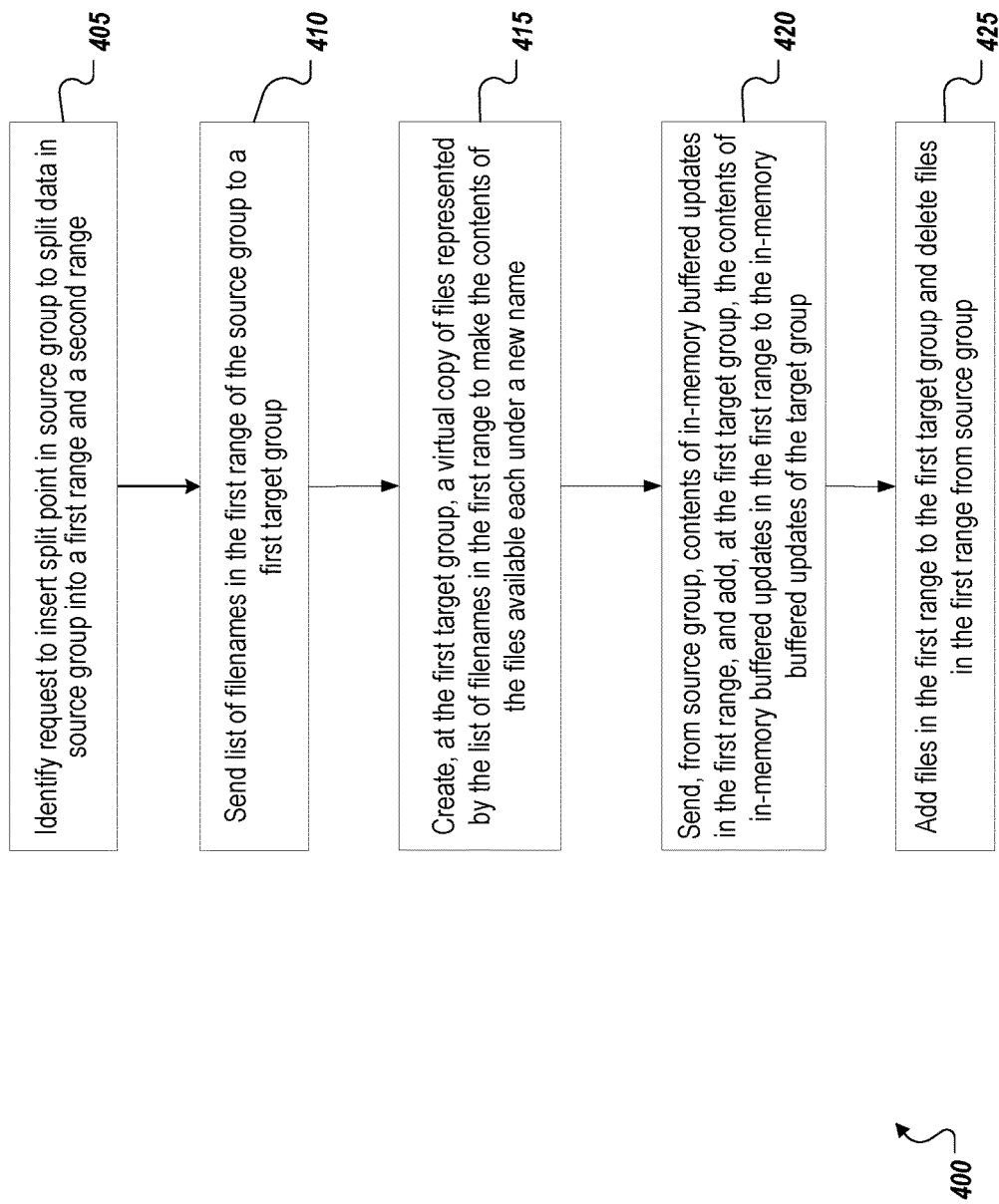
FIG. 4 is a flow chart of an example process for splitting large groups in a distributed storage system.

FIG. 4 is a flow chart of an example process 400 for splitting large groups in a distributed storage system. At 405, a request to insert a split point in a source group is identified.

The source group may include one or more tablet replicas, each tablet including at least a portion of data from a table in the distributed database system. The split point may split the data in the source group into a first range and a second range different than the first range. In response to the request to insert the split point in the source group, a list of filenames in the first range of the source group may be sent to a first target group at 410. The first target group may include one or more tablet replicas. Although this example is described with reference to inserting or removing a split point, the same systems and methods apply to inserting or removing many split points simultaneously or at substantially the same time.

At 415, a virtual copy of files represented by the list of filenames in the first range may be created at the first target group. The virtual copy or snapshot is similar to a symbolic link, as the virtual copy or reference file makes the contents of the files available each under a new name without requiring duplication of the underlying data of the files.

At 420, contents of in-memory buffered updates in the first range may be sent from the source group to the first target group. Further, the contents of the in-memory buffered updates in the first range from the source group may be added to the in-memory buffered updates of the first target group.

At 425, the files in the first range may be added to the first target group, and the source group may be instructed that the first target group no longer depends on the files in the first range at the source group. In response, the files in the first range may be deleted from the source group. For example, the source group may delete the files in the first range when the source group rewrites the files at its next periodic compaction.

In certain embodiments, the process may further include, in response to the request to insert the split point in the source group, sending a list of filenames in the second range of the source group to a second target group, the second target group including one or more tablet replicas. In addition, a virtual copy of files represented by the list of filenames in the second range may be created at the second target group, the virtual copy making the contents of the files available each under a new name without duplicating data of the files. According to certain embodiments, the process of the distributed transaction is executed according to a two-phase commit protocol comprising a voting phase and a commit phase. A majority of tablets in each group must commit in the voting phase for the distributed transaction to complete. On the other hand, in response to a vote to abort in the voting phase, each group undoes the transaction.

Figure 5:
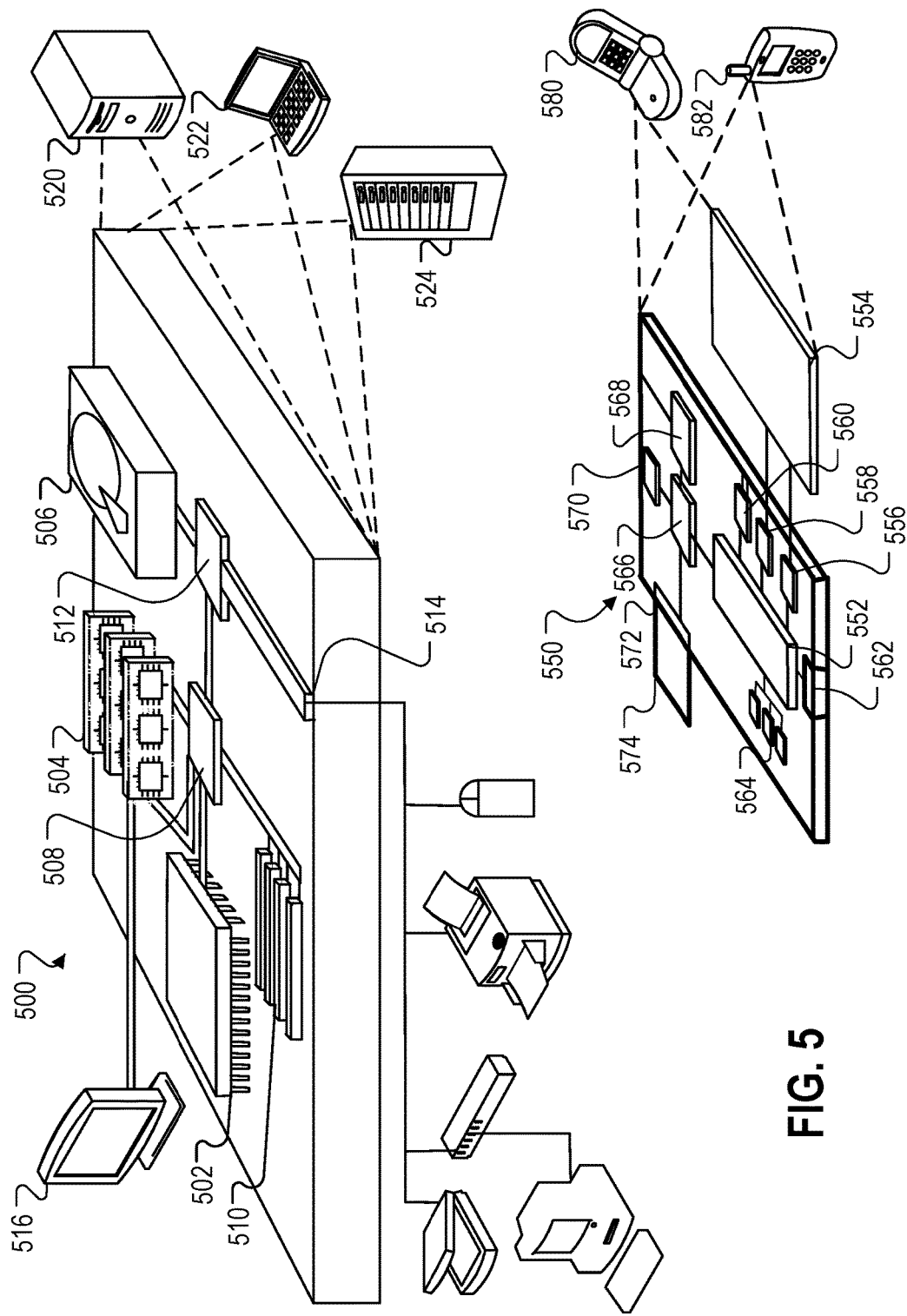
FIG. 5 is a diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for a distributed transaction in a distributed database system executed by one or more processors, the method comprising:
    identifying a request to insert a split point in a source group, the source group comprising one or more tablet replicas, each tablet comprises a list of immutable files or layers including at least a portion of data from a table in the distributed database system, and the split point splitting the data in the source group into a first range and a second range different than the first range;
    in response to the request to insert the split point in the source group:
        sending a list of filenames in the first range of the source group to a first target group of a plurality of target groups, the first target group comprising one or more tablet replicas;
        creating, at the first target group, a virtual copy of files represented by the list of filenames in the first range, the virtual copy making data of the files available, each using a new name, without duplicating the data of the files;
        applying a distributed transaction including the source group and the target groups, wherein the transaction updates metadata tables to reflect new data locations, split points and metadata split points in the source group and target groups to reflect the move, and wherein the transaction further comprises range data for the source group and target group, wherein the range data specifies ranges of user data to be moved;
        applying the range data by a source tablet of the source group, preserving a current layer stack and preparing the current layer stack for being served to a target tablet of the first target group;
        retrieving the current layer stack of the source tablet and inserting one or more proxy layers in an apply loop which specify the ranges to be moved; and
        writing contents of all ranges that have been moved into a replicated table in the first target group before deleting the source group.

2. The method of claim 1, comprising:
adding the files in the first range to the first target group;
instructing the source group that the first target group no longer depends on the files in the first range at the source group; and
deleting the files in the first range from the source group.

3. The method of claim 1, comprising:
in response to the request to insert the split point in the source group:
    sending a list of filenames in the second range of the source group to a second target group, the second target group comprising one or more tablet replicas; and
    creating, at the second target group, a virtual copy of files represented by the list of filenames in the second range, the virtual copy making the contents of the files available each under a new name without duplicating data of the files.

4. The method of claim 1, comprising:
sending, from the source group, contents of in-memory buffered updates in the first range; and
adding, at the first target group, the contents of in-memory buffered updates in the first range from the source group to the in-memory buffered updates of the first target group.

5. The method of claim 1, wherein the distributed transaction is executed according to a two-phase commit protocol comprising a voting phase and a commit phase, wherein applying the distributed transaction occurs after the voting phase and during the commit phase.

6. The method of claim 5, wherein a majority of tablets in each group must commit in the voting phase for the distributed transaction to complete.

7. The method of claim 5, wherein, in response to a vote to abort in the voting phase, each group undoes the transaction.

8. A system for executing a distributed transaction in a distributed database, the system comprising:
    memory for storing data; and
    one or more processors operable to access the memory and perform operations comprising:
        identifying a request to insert a split point in a source group, the source group comprising one or more tablet replicas, each tablet comprises a list of immutable files or layers including at least a portion of data from a table in the distributed database system, and the split point splitting the data in the source group into a first range and a second range different than the first range;
        in response to the request to insert the split point in the source group:
            sending a list of filenames in the first range of the source group to a first target group of a plurality of target groups, the first target group comprising one or more tablet replicas; and creating, at the first target group, a virtual copy of files represented by the list of filenames in the first range, the virtual copy making data of the files available, each using a new name, without duplicating the data of the files;

applying a distributed transaction including the source group and the target groups, wherein the transaction updates metadata tables to reflect new data locations, split points and metadata split points in the source group and target groups to reflect the move, and wherein the transaction further comprises range data for the source group and target groups, wherein the range data specifies the ranges of user data to be moved;

applying the range data by a source tablet of the source group, preserving a current layer stack and preparing the current layer stack for being served to a target tablet of the first target group;

retrieving the current layer stack of the source tablet and inserting one or more proxy layers in an apply loop which specify the ranges to be moved; and writing contents of all ranges that have been moved into a replicated table in the first target group before deleting the source group.

9. The system of claim 8, wherein the operations comprise:
adding the files in the first range to the first target group;
instructing the source group that the first target group no longer depends on the files in the first range at the source group; and
deleting the files in the first range from the source group.

10. The system of claim 8, wherein the operations comprise:
in response to the request to insert the split point in the source group:
sending a list of filenames in the second range of the source group to a second target group, the second target group comprising one or more tablet replicas; and
creating, at the second target group, a virtual copy of files represented by the list of filenames in the second range, the virtual copy making the contents of the files available each under a new name without duplicating data of the files.

11. The system of claim 8, wherein the operations comprise:
sending, from the source group, contents of in-memory buffered updates in the first range; and
adding, at the first target group, the contents of in-memory buffered updates in the first range from the source group to the in-memory buffered updates of the first target group.

12. The system of claim 8, wherein the distributed transaction is executed according to a two-phase commit protocol comprising a voting phase and a commit phase.

13. The system of claim 12, wherein a majority of tablets in each group must commit for the distributed transaction to complete.

14. The system of claim 12, wherein, in response to a vote to abort in the voting phase, each group undoes the transaction.

15. A non-transitory, computer-readable medium storing instructions operable when executed to cause at least one processor to perform operations for executing a distributed transaction in a distributed database, the operations comprising:

identifying a request to insert a split point in a source group, the source group comprising one or more tablet replicas, each tablet comprises a list of immutable files or layers including at least a portion of data from a table in the distributed database system, and the split point splitting the data in the source group into a first range and a second range different than the first range;

in response to the request to insert the split point in the source group:
sending a list of filenames in the first range of the source group to a first target group of a plurality of target groups, the first target group comprising one or more tablet replicas; and
creating, at the first target group, a virtual copy of files represented by the list of filenames in the first range, the virtual copy making data of the files available, each using a new name, without duplicating the data of the files;

applying a distributed transaction including the source group and the target groups, wherein the transaction updates metadata tables to reflect new data locations, split points and metadata split points in the source group and target groups to reflect the move, and wherein the transaction further comprises range data for the source group and target groups, wherein the range data specifies the ranges of user data to be moved;

applying the range data by a source tablet of the source group, preserving a current layer stack and preparing the current layer stack for being served to a target tablet of the first target group;

retrieving the current layer stack of the source tablet and inserting one or more proxy layers in an apply loop which specify the ranges to be moved; and writing contents of all ranges that have been moved into a replicated table in the first target group before deleting the source group.

16. The computer-readable medium of claim 15, wherein the operations comprise:
adding the files in the first range to the first target group;
instructing the source group that the first target group no longer depends on the files in the first range at the source group; and
deleting the files in the first range from the source group.

17. The computer-readable medium of claim 15, wherein the operations comprise:
in response to the request to insert the split point in the source group:
sending a list of filenames in the second range of the source group to a second target group, the second target group comprising one or more tablet replicas; and
creating, at the second target group, a virtual copy of files represented by the list of filenames in the second range, the virtual copy making the contents of the files available each under a new name without duplicating data of the files.

18. The computer-readable medium of claim 15, wherein the operations comprise:
sending, from the source group, contents of in-memory buffered updates in the first range; and
adding, at the first target group, the contents of in-memory buffered updates in the first range from the source group to the in-memory buffered updates of the first target group.

19. The computer-readable medium of claim 15, wherein the distributed transaction is executed according to a two-phase commit protocol comprising a voting phase and a commit phase.

20. The computer-readable medium of claim 19, wherein a majority of tablets in each group must commit for the distributed transaction to complete, and
   if the voting phase includes a vote to abort, each group undoes the transaction.

* * * * *